US 10,895,200 B2

(12) United States Patent
Nowakowski et al.

(10) Patent No.: US 10,895,200 B2
(45) Date of Patent: Jan. 19, 2021

(54) AIRCRAFT TURBINE ENGINE WITH IMPROVED MECHANICAL POWER TAKEOFF (71) Applicant: SAFRAN AIRCRAFT ENGINES, Paris (FR)

(72) Inventors: Nathalie Nowakowski, Cesson (FR); Thomas Alain Christian Vincent, Saint Maurice (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 441 days.

(21) Appl. No.: 15/307,066

(22) PCT Filed: Apr. 27, 2015

(86) PCT No.: PCT/FR2015/051133
§ 371 (c)(1),
(2) Date: Oct. 27, 2016

(87) PCT Pub. No.: WO2015/166179
PCT Pub. Date: Nov. 5, 2015

(65) Prior Publication Data
US 2017/0051672 A1 Feb. 23, 2017

(30) Foreign Application Priority Data
Apr. 29, 2014 (FR) ...................... 14 53890

(51) Int. Cl.
*F02C 7/06* (2006.01)
*F02C 7/36* (2006.01)
(Continued)

(52) U.S. Cl.
CPC .............. *F02C 7/06* (2013.01); *F01D 25/162* (2013.01); *F02C 7/32* (2013.01); *F02C 7/36* (2013.01);
(Continued)

(58) Field of Classification Search
CPC .......... F02D 41/0007; F02C 7/32; F02C 7/06; F02C 7/36; F01D 15/12; F05D 2260/40311
(Continued)

(56) References Cited

U.S. PATENT DOCUMENTS 4,118,997 A    10/1978  Woodward et al.
5,107,676 A *  4/1992   Hadaway ................ F01D 25/18
                                                    184/6.11
(Continued)

FOREIGN PATENT DOCUMENTS

EP    1 911 938 A1    4/2008
EP    1 918 564 A2    5/2008
FR    2 908 461 A1    5/2008

OTHER PUBLICATIONS

International Search Report dated Jul. 27, 2015 in PCT/FR2015/051133, filed Apr. 27, 2015.
(Continued)

*Primary Examiner* — Courtney D Heinle
*Assistant Examiner* — Andrew Thanh Bui
(74) *Attorney, Agent, or Firm* — Oblon, McClelland, Maier & Neustadt, L.L.P.

(57) ABSTRACT

An aircraft turbine engine includes a fan and a reduction gear including a plurality of rotary elements and driving the fan. The turbine engine further includes a gearbox and a mechanical power takeoff box driving the gearbox. The turbine engine includes a first toothed wheel and a second toothed wheel forming part of the mechanical power takeoff box and meshing with the first toothed wheel.

19 Claims, 6 Drawing Sheets (51) Int. Cl.
  *F02C 7/32* (2006.01)
  *F01D 25/16* (2006.01)
  *F02K 3/06* (2006.01)

(52) U.S. Cl.
  CPC ............ *F02K 3/06* (2013.01); *F05D 2230/60* (2013.01); *F05D 2230/70* (2013.01); *F05D 2240/53* (2013.01); *F05D 2260/40311* (2013.01); *F05D 2260/98* (2013.01); *Y02T 50/60* (2013.01)

(58) Field of Classification Search
  USPC ..................................................... 415/122.1
  See application file for complete search history.

(56) References Cited

U.S. PATENT DOCUMENTS

| | | | | |
|---|---|---|---|---|
| 5,136,837 A * | 8/1992 | Davison | ................... | F02C 6/08 60/39.183 |
| 5,845,483 A | 12/1998 | Petrowicz | | |
| 6,735,954 B2 * | 5/2004 | MacFarlane | ............ | F02C 6/206 60/793 |
| 8,702,373 B1 | 4/2014 | Valva et al. | | |
| 8,887,487 B2 * | 11/2014 | Kupratis | ................... | F02C 7/36 60/226.1 |
| 2006/0248900 A1 | 11/2006 | Suciu et al. | | |
| 2008/0098712 A1 | 5/2008 | Sheridan | | |
| 2008/0110151 A1 | 5/2008 | Welch et al. | | |
| 2008/0173114 A1 | 7/2008 | Charier et al. | | |
| 2011/0030385 A1 | 2/2011 | Ellans et al. | | |
| 2014/0165589 A1 * | 6/2014 | Cloft | ...................... | F02C 7/268 60/786 |
| 2015/0369132 A1 * | 12/2015 | Roberge | ................. | F01D 25/28 415/124.1 |
| 2017/0284220 A1 * | 10/2017 | Roberge | ..................... | F02C 9/00 |
| 2018/0045068 A1 * | 2/2018 | Brinson | ................. | B64D 13/06 |

OTHER PUBLICATIONS

French Preliminary Search Report dated Jan. 22, 2015 in French Application 14 53890, filed Apr. 29, 2014.

* cited by examiner

AIRCRAFT TURBINE ENGINE WITH IMPROVED MECHANICAL POWER TAKEOFF

TECHNICAL FIELD

The present invention relates to the field of aircraft turbine engines comprising a mechanical power takeoff housing, also referred to as an "IGB" (inner gearbox) housing.

The invention applies particularly to bypass turbojet engines, the fan of which is driven by a gearbox.

PRIOR ART

On existing turbine engines comprising a gearbox for driving the fan surrounded by a fan casing, taking off mechanical power on the high-pressure drive shaft is known, for driving a gearbox. The latter, also referred to as an "AGB" (accessory gear box), is for example housed in an inter-duct compartment of the turbine engine, that is to say a compartment situated radially between the primary channel and the secondary channel of the turbine engine.

Such a gearbox is conventionally formed by means of shafts carrying spur gears for rotating one another, and for driving the equipment with which they are associated. By way of indicative example, the equipment may be of the fuel pump, hydraulic pump, lubrication pump, alternator, starter, or electric-power generator type.

For taking off mechanical power on the high-pressure drive shaft, a takeoff box is provided, referred to as the IGB (inner gearbox). This box comprises a toothed wheel meshing with another toothed wheel, constrained to rotate with the high-pressure drive shaft. The IGB box in its turn rotates a mechanical power takeoff shaft, intended for its part to drive the gearbox, normally via an angle return box, also referred to as a "TGB" (transfer gear box).

Nevertheless, in particular in the case of breakdown, it may happen that mechanical power takeoff requirements remain without being able to be produced by the high-pressure body that is weakly driven or no longer rotating. It is a case for example of a need for lubrication of the reduction gear, which, when the fan continues to turn through a phenomenon of autorotation ("windmilling"), must still be lubricated.

There therefore exists a requirement for optimising the design of such turbine engines in order better to respond to the requirements for mechanical power takeoff, in particular in the case of breakdown.

DISCLOSURE OF THE INVENTION

The aim of the invention is therefore to propose a solution at least partially remedying the problems mentioned above, encountered in the solutions of the prior art.

To do this, the subject matter of the invention is a front part of an aircraft turbine engine comprising the features of claim 1.

With this arrangement specific to the invention, in particular in the case of breakdown on the turbine engine, the reliability of the mechanical power takeoff by the dedicated box is increased, since the whole of the low-pressure body is able to continue to rotate by autorotation effect of the fan. This reliability is all the more increased since the takeoff takes place on the driving element of this autorotation, that is to say the fan. This is particularly advantageous for responding to a vital requirement for lubrication of the reduction gear, even after a breakdown that has occurred on the turbine engine.

Moreover, it has been revealed that such a mechanical power takeoff led to higher global performances than those obtained in the conventional power takeoff solutions on the high-pressure shaft. In this regard, on such turbine engines with a reduction gear, savings in fuel ranging up to 4% have been recorded. This is partly explained by a lower power takeoff on the high-pressure body, which moreover makes it possible to reduce the dimensions thereof.

In addition, it is noted that the presence of a reduction gear in the low-pressure body, for driving the fan, is generally adopted for obtaining a high dilution ratio, typically greater than ten. For the record, the dilution ratio is the ratio of the mass of air passing through the fan to the mass of air used in the combustion chamber. The presence of a reduction gear allows an increase in the diameter of the fan and therefore promotes the obtaining of a higher dilution ratio, giving rise to better efficiency. Increasing this dilution ratio is also dependent on the use of a high-pressure body with smaller and smaller dimensions in comparison with the dimensions of the fan, which makes any mechanical power takeoff on the high-pressure shaft tricky. By taking off the power on the low-pressure body, and in particular on the fan, the invention consequently affords a satisfactory response to the difficulties encountered in the solutions of the prior art, with a takeoff on the high-pressure body.

In the particular case of the problem of lubrication of the reduction gear, it is noted that taking off mechanical power on the fan makes it possible to install compact lubrication means, propitious to a reduced overall space requirement. This is because these lubrication means no longer need to be oversized as in the solutions of the prior art, in which the takeoff took place on the high-pressure body, able to provide only a limited power in the case of breakdown. Naturally, this finding can be made for other types of equipment of the turbine engine, not only for the means for lubricating the reduction gear driving the fan.

The invention moreover has at least one of the following optional features, taken in isolation or in combination.

The fan hub is supported by two fan bearings, and the first toothed wheel is arranged axially between the two rolling bearings.

The reduction gear comprises a gear train. This gear train is preferentially either epicyclic or planetary. It is noted that conventionally the train is said to be epicyclic when the ring is rotationally fixed, while it is said to be planetary when the planet carrier is rotationally fixed.

Preferably, the epicyclic train comprises:
- a sun gear rotated by a low-pressure shaft of the low-pressure body, and preferably constrained to rotate with this low-pressure shaft;
- an external ring secured to a stator of the turbine engine;
- planets meshing with the external ring and the sun gear; and
- a planet holder rotating a hub of the fan, preferably constrained to rotate with this hub.

The reduction gear is of the plain bearing type. For the record, plain bearings function like rolling bearings but the advantage lies in the fact that the rolling bodies are advantageously replaced by a film of oil. The result is an appreciable saving in terms of size. However, plain bearings do not withstand the degradation of the film of oil, which must always be present and have a certain speed (for hydrodynamic plain bearings), or a certain pressure (for hydrostatic plain bearings). During any autorotation phase of the fan, the design of the invention allows vital lubrication of these bearings by means of the takeoff made on the first toothed wheel, constrained to rotate with the fan. This principle is also valid on the ground, when the fan begins to rotate and the reduction gear must be lubricated.

Optionally, the front part of the turbine engine comprises another mechanical power takeoff box driving the gearbox, this other box taking off the power on a high-pressure shaft of the high-pressure body of the turbine engine. The two takeoff boxes can then function simultaneously and/or in alternation. According to another preferred embodiment the gearbox is solely supplied with power by the first mechanical power takeoff box, cooperating with the hub of the fan.

Said plurality of items of equipment comprise, driven by the gearbox, one or more items of equipment including a fuel pump, a hydraulic pump, a lubrication pump, an alternator, a starter or an electric power generator. As mentioned above, this or these items of equipment, driven by the gearbox of the turbine engine, are preferentially housed in the inter-duct compartment, just like the housing constituting the main gearbox of the turbine engine.

Another subject matter of the invention is a turbine engine comprising such a front part. Finally, this turbine engine is preferentially a turbojet engine.

Other advantages and features of the invention will emerge from the following non-limitative detailed description.

BRIEF DESCRIPTION OF THE DRAWINGS

This description will be given with regard to the accompanying drawings, among which.

DETAILED DESCRIPTION OF PREFERRED EMBODIMENTS

Figure 1:
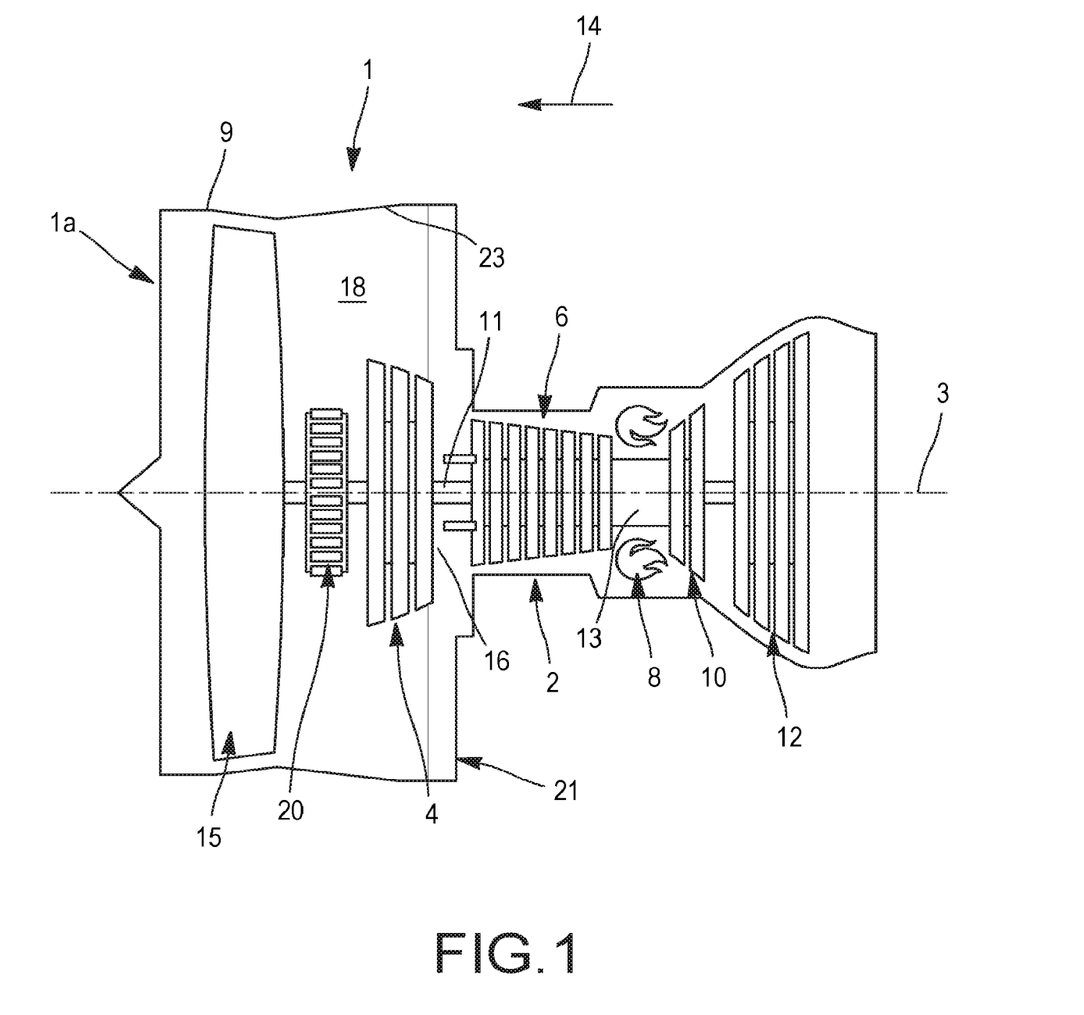
FIG. 1 depicts a schematic side view of a turbojet engine according to the invention.
Figure 2:
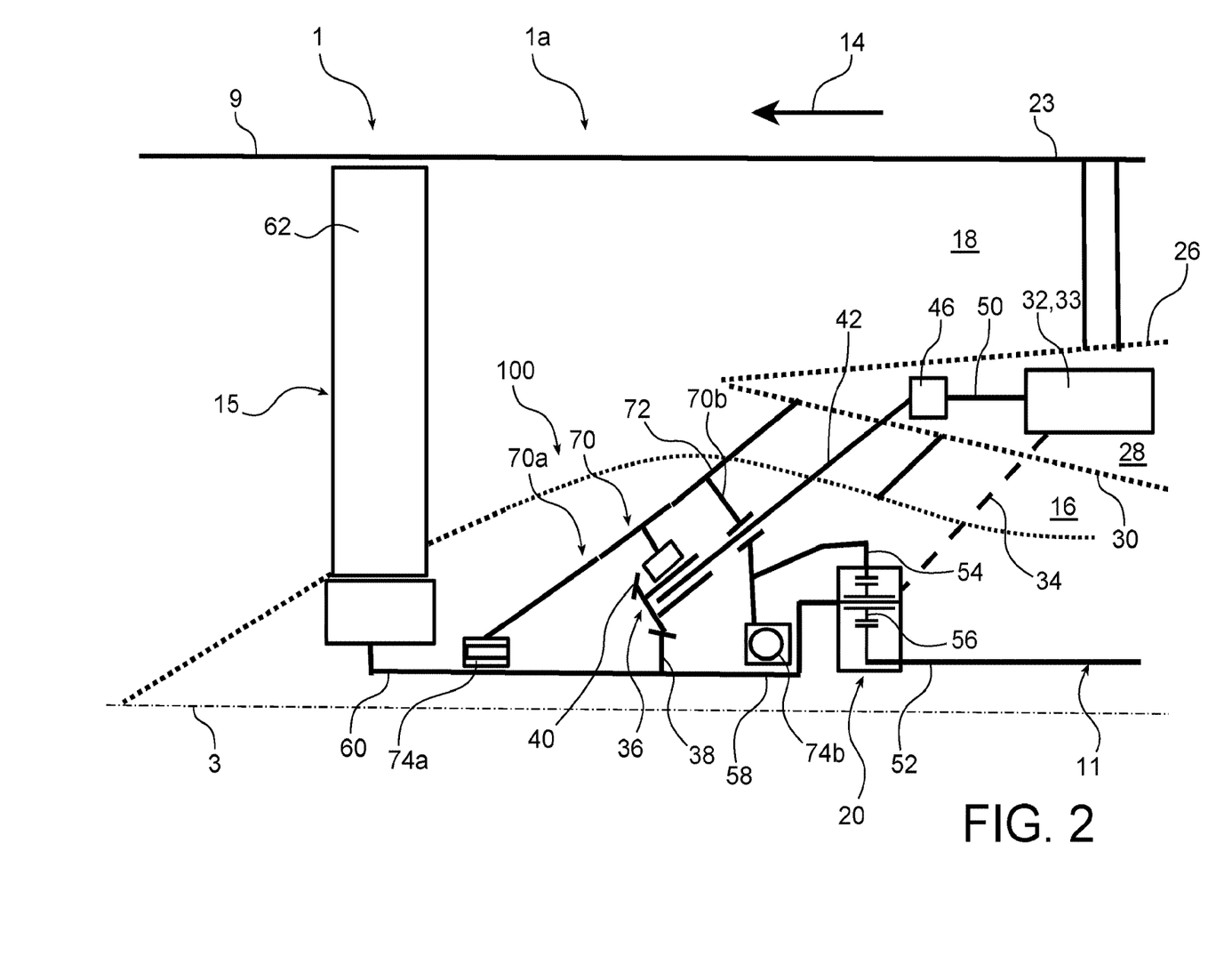
FIG. 2 depicts a more detailed enlarged view of a front part of the turbojet engine shown in the previous figure, according to a preferring embodiment of the invention.

With reference first of all to FIGS. 1 and 2, a double-body bypass turbojet engine 1 is shown, having a high dilution ratio. The turbojet engine 1, which has a front part referenced 1a in FIG. 2, comprises in a conventional fashion a gas generator 2 on either side of which are arranged a low-pressure compressor 4 and a low-pressure turbine 12, this gas generator 2 comprising a high-pressure compressor 6, a combustion chamber 8 and a high-pressure turbine 10. Hereinafter the terms "front" and "rear" are considered in a direction 14 opposite to the main direction of flow of the gases in the turbojet engine, this direction 14 being parallel to the longitudinal axis 3 of said direction.

The low-pressure compressor 4 and the low-pressure turbine 12 form a low-pressure body and are connected to each other by a low-pressure shaft 11 centred on the axis 3. Likewise, the high-pressure compressor 6 and the high-pressure turbine 10 form a high-pressure body and are connected to each other by a high-pressure shaft 13 centred on the axis 3 and arranged around the low-pressure shaft 11.

The turbojet engine 1 moreover comprises, in front of the gas generator 2 and low-pressure compressor 4, a fan 15. This fan rotates on the axis 3, and is surrounded by a fan casing 9. It is not driven directly by the low-pressure shaft 11, but only driven indirectly by this shaft. This is because a reduction gear 20 is arranged between the low-pressure body and the fan 15, being disposed axially between the latter and the low-pressure compressor 4. The presence of the reduction gear 20 driving the fan 15 makes it possible to provide a larger fan diameter and therefore assists the obtaining of a higher dilution ratio, providing a saving in fuel consumption.

Furthermore, the turbojet engine 1 defines a first channel 16 intended to have a primary flow pass through it, as well as a secondary channel 18 intended to have a secondary flow pass through it, situated radially towards the outside with respect to the primary flow. As is known to persons skilled in the art, this secondary channel 18 is delimited radially towards the outside by an external collar 23 of the intermediate casing 21. This also comprises a hub connected to the external collar 23 by means of radial arms. The external collar 23, preferentially metal, extends the fan casing 9 towards the rear.

In addition, the secondary channel 18 is delimited radially towards the inside by an internal delimitation surface 26 also serving as external delimitation to an inter-duct compartment 28, visible in FIG. 2. This inter-duct compartment 28 is also delimited towards the front by the hub of the intermediate casing, and radially towards the inside by a collar 30 enclosing the low-pressure compressor 4 mentioned above.

In the turbojet engine 1, a AGB box 32 or an item of turbojet equipment requiring mechanical power is provided, this box hereinafter being referred to as the AGB box 32. It is placed in the inter-duct compartment 28, for example fixed to a downstream face of the hub of the intermediate casing. Nevertheless, this location may be different, and this is the reason why, in FIG. 2, this AGB box 32 has simply been shown schematically in the inter-duct compartment 28, without any specific attachment.

Conventionally, as indicated previously, the AGB box 32 is formed by means of shafts carrying spur pinions so as to rotate one another, and to drive the equipment with which they are associated, housed in the inter-duct compartment 28. Here, only one item of equipment has been shown, schematically. It is an item of equipment 33 for supplying the reduction gear 20 with lubricant, via a lubrication conduit 34. Nevertheless, other items of equipment are provided, such as for example of the fuel pump, hydraulic pump, alternator, starter or electric power generator type.

For taking off mechanical power intended to supply the AGB box 32, a take-off box 36 is provided, hereinafter referred to as the IGB box. A first toothed wheel 38 centred on the axis 3 and driven by the fan 15 meshes with a second toothed wheel 40 of the IGB box 36. The first wheel 38 then corresponds to a power take-off wheel, referred to as a driving wheel.

The second toothed wheel 40, referred to as a driven wheel, houses a mechanical power take-off shaft 42 that it rotates on the axis of the shaft, the latter preferably being inclined in the direction of the axis 3. The take-off shaft 42 cooperates at its opposite end with an angle return box 46, hereinafter referred to as the TGB box and placed in the inter-duct compartment 28. Finally, to complete the kinematic chain between the TGB box 46 and the AGB box 32, a rotary transmission shaft 50 is provided.

The reduction gear 20 comprises an epicyclic train. It should be noted that, conventionally, the train is said to be epicyclic when the ring is rotationally flexed, while it is said to be planetary when the planet holder is rotationally fixed. Here it comprises first of all a sun gear 52 centred on the axis 3 and constrained to rotate with the low-pressure shaft 11, while being arranged in line with this shaft 11 at the front. The two elements 11, 52 may be produced in a single piece, or preferentially attached fixedly to each other. The epicyclic train comprises moreover an external ring 54, secured to a stator of the turbojet engine. Planets 56 are also provided, meshing with the external ring 54 and the sun gear 52. Finally, the epicyclic train comprises a planet-carrier shaft 58 constrained to rotate with the fan hub 60, also referred to as the fan rotor, the latter carrying the fan blades 62 by means of a fan disc. Here also, the two elements 58, 60 may be produced in a single piece, or preferentially attached fixedly to each other. In another possible configuration, not shown, referred to as a planetary train, the planet carrier 58 is secured to the stator of the turbojet engine, and the external ring 54 is constrained to rotate with the fan hub 60.

The aforementioned first toothed wheel 38, driving the IGB box 36, is constrained to rotate with the fan hub 60, while being fixed to the planet carrier 58 or to the fan hub 60, as shown schematically in FIG. 2. Thus, since the reduction gear 20 is driven by the low-pressure shaft 11, this gearbox and the fan 15 may be considered to form part of the low-pressure body of the turbojet engine. The advantage lies here in the fact that, during an autorotation phase of the fan, in which all or part of the power causing the rotation of the low-pressure body comes from a source other than the high-pressure body, for example from the aerodynamic force applied to the blades of the fan, it is always possible to take off a minimum mechanical power therefrom. This is particularly advantageous for meeting a vital requirement for lubrication of the reduction gear 20 during autorotation of the fan. Particularly to reduce the mass and size of the reduction gear 20, the latter is designed with plain bearings (not shown in FIG. 2) supporting its rotary elements. Thus, in this advantageous design, the conventional rolling bodies of the rolling bearings are replaced by a film of oil, which has either a certain speed for bearings of the hydrodynamic type or a certain pressure for bearings of the hydrostatic type. Consequently, during any autorotation of the fan, the design of the invention allows vital lubrication of these plain bearings, by means of the take-off made on the first tooth wheel 38, which remains driven by the fan 15 in rotation. This is because the rotation of the fan 15 drives in a chain the rotation of the first toothed wheel 38, the rotation of the second toothed wheel 40, the rotation of the shafts 42, 50, the driving of the AGB box 32 and finally the actuation of the equipment 33 causing the lubrication of the reduction gear 20, via the conduit 34. This lubrication prevents degradation of the films of oil of the plain bearings of this gearbox, and thus ensures correct functioning of the latter while prolonging its service life.

It should be noted that, in the case of autorotation of the fan, lubrication of the reduction gear 20 is effectively ensured in the manner disclosed above, but other conventional means could be provided in addition to ensure lubrication of this gearbox outside any autorotation phase.

With reference now to FIGS. 2 to 5, an assembly 100 forming an integral part of the turbojet engine 1 is shown. The assembly 100 comprises first of all a rolling bearing support 70, connected to the internal delimitation casing of the first channel 16 by means of a structural flange 72, shown only schematically in FIG. 2. The bearing support 70 therefore forms part of the stator of the turbojet engine 1. It is situated in front of the reduction gear 20 and supports, at its two opposite axial ends, respectively two rolling bearings 74a, 74b. The two bearings guide a rotary assembly intended to be driven by the gas generator 2, this assembly comprising the planet carriers 58 of the reduction gear, the hub 60 of the fan and the first toothed wheel 38. The first toothed wheel 38 is arranged axially between the two rolling bearings 74a, 74b.

Figure 3:
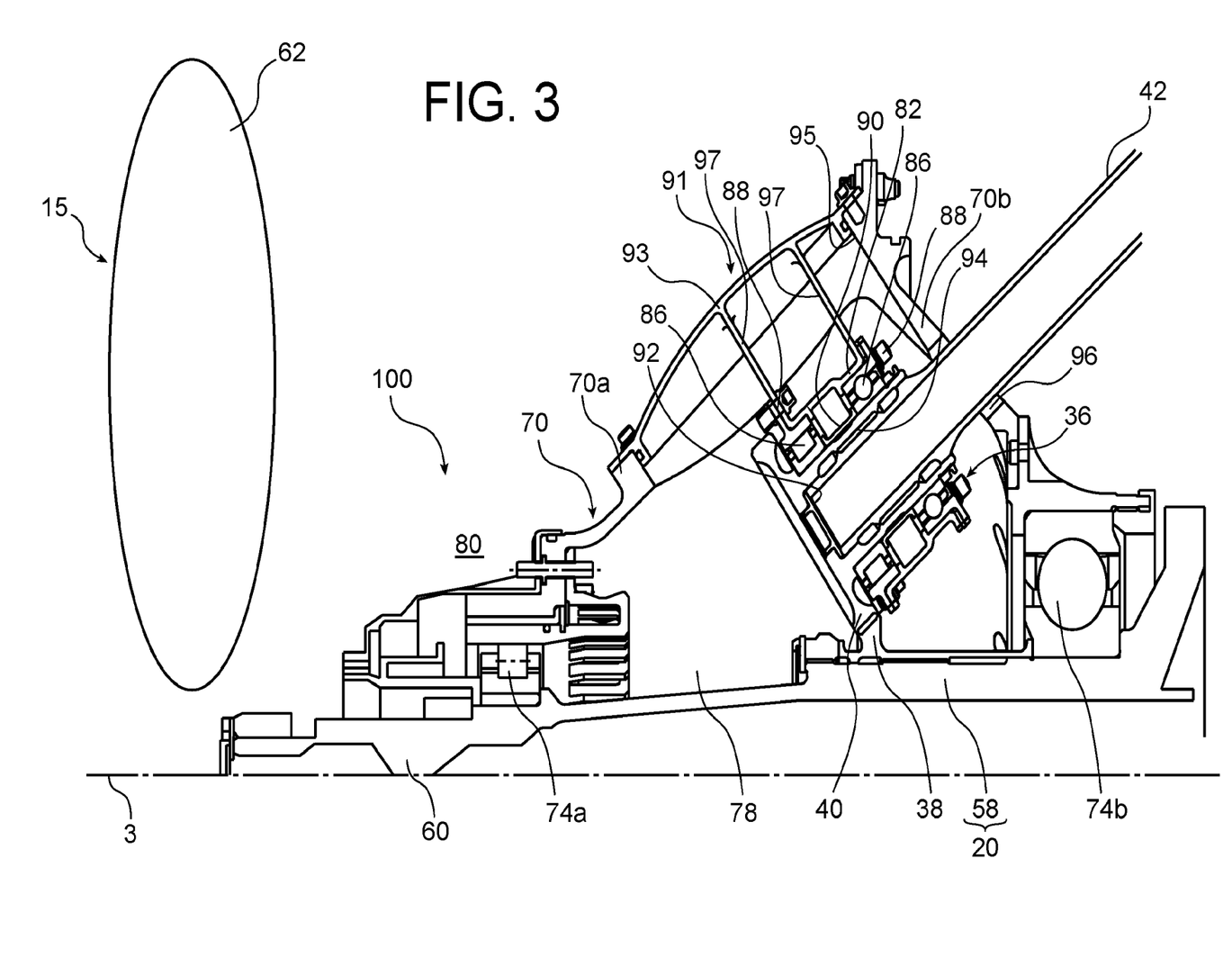
FIGS. 3 to 5 are detailed views of a front part of the turbojet engine shown in the previous figures, showing an assembly specific to the invention.
Figure 4:
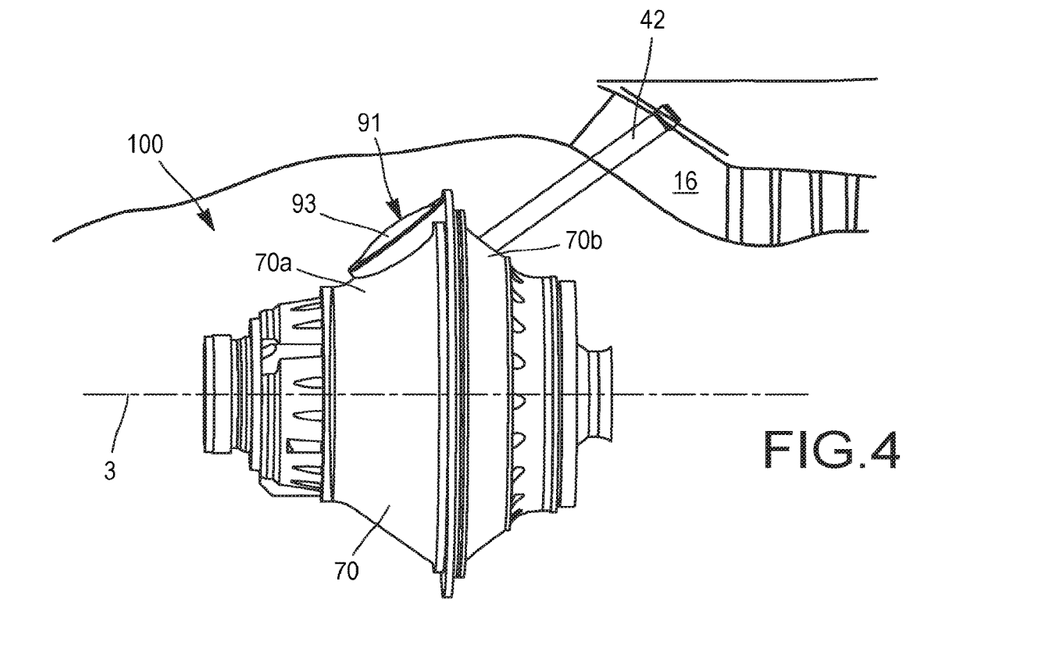
Figure 5:
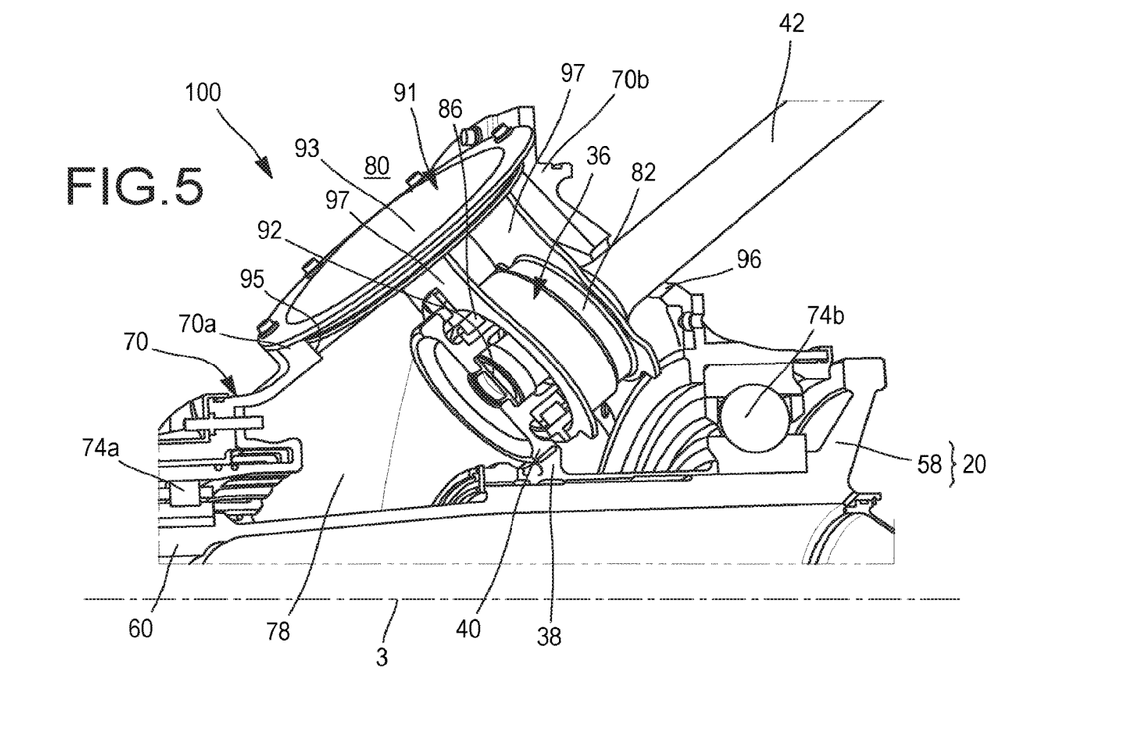

The bearing support 70 centred on the axis 3. It delimits a radially internal space 78 in which the bearings 74a, 74b are placed, and partly forms a lubrication chamber. The support is achieved by means of a part in a single piece, or a plurality of parts fixed to one another as shown in FIGS. 3 to 5. It is a case in fact of two parts attached to each other by axial bolts, the most rearward part, with the smallest dimension, carrying the rolling bearing 74b supporting the planet carrier 58.

Together, the two bearing support parts 70 form first and second portions 70a, 70b, inclined with respect to each other. These two portions form a V in an axial half-section, the V being open radially towards the inside and defining an angle of inclination of between 30° and 120° between the two portions, and preferably around 90°.

The aforementioned IGB box 36 is also placed in the radially internal space 78, opposite to a radially external space 80. In this regard, it is indicated that, on the same side as the front portion 70a of the bearing support 70, this external space 80 is situated outside the lubrication chamber, while, on the same side as the rear portion 70b of the bearing support 70, this external space 80 forms part of the lubrication chamber also integrating the internal space 78.

As indicated previously, the IGB box 36 comprises the second toothed wheel 40, rotated by the first toothed wheel 38 secured to the planet carrier 58. The axes of these wheels being inclined with respect to each other, conical meshings are used. The second wheel 40 is carried by a fixed body 82, in which this same wheel 40 is housed.

The IGB box 36 will now be described more specifically with reference to FIGS. 3 and 5. Its body 82 is in the form of a jacket receiving the second toothed wheel 40, with bearings 86 interposed between these elements. The bearings 86 and the wheel 40 are held on the body 82 by screwed elements 88, arranged at the axial ends of the IGB box 36. More precisely, these screwed elements make it possible to secure the outer races of the bearings 88 to the body 82. In addition, a strap 90 is provided between the inner races of the two bearings 88.

The second toothed wheel 40 defines internally a housing in which the front end of the shaft 42 is housed. The mounting is sliding, preferably so that this shaft is only in axial abutment in the bottom of the housing, that is to say in axial abutment against a bottom 92 defined by the wheel 40. Thus this facilitates the operations of introducing and extracting the shaft 42, during maintenance operations. For the rotational driving of the shaft 42, the latter has a structured external surface cooperating with the internal surface of the wheel 40. A connection 94 of the fluted type can thus be used for achieving this rotational driving.

From its front end housed in the IGB box 36, the take-off shaft 42 extends towards the rear, and radially towards the outside as far as the TGB box 46. To do this, it passes through a first opening 96 formed on the bearing support 70, and more precisely formed through the second portion 70b of this support. It next passes through the first channel 16 before being connected to the TGB box 46.

Finally, the assembly 100 comprises means 91 for mounting the body 82 of the IGB box 36, on the first portion 70a of the bearing support 70. These mounting means 91 comprise first of all means forming a cover 93, closing off a second opening 95 formed through the first portion 70a. A sealed connection is provided between the support 70 and the cover 93 screwed onto the support, to close the lubrication chamber 78 in a satisfactory manner and to prevent leakage of oil and a pressure drop in the lubrication chamber. The mounting means 91 also comprise means 97 of connection between the cover 93 and the body 82 of the IGB box 36. These connection means 97 are formed here by two plates, for example produced in a single piece with the cover and/or with the body 82. These two plates are thus connected to the internal surface of the cover 93, and pass through the second opening 95 of the support. This second opening 95 is moreover configured to enable the take-off box to be introduced into the radially internal space, as will now be described with reference to FIGS. 6a to 6f.

In these figures, various successive steps of a method for mounting the assembly 100 are in fact shown.

Figure 6A:
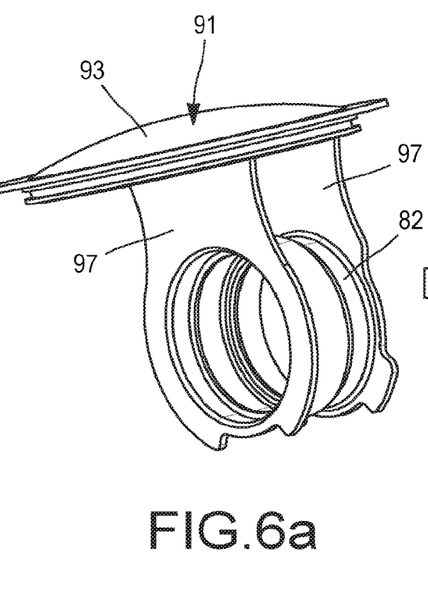
FIGS. 6a to 6f show views depicting schematically various steps of a method for mounting the assembly shown in FIGS. 3 to 5.
Figure 6B:
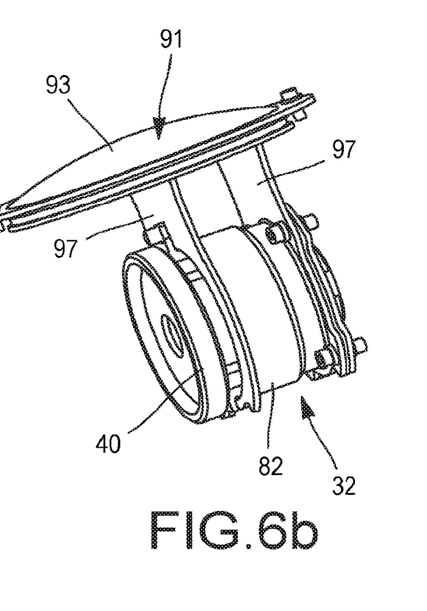

First of all with reference to FIGS. 6a to 6b', the IGB box 36 is assembled outside the turbojet engine, being mounted on its mounting means 91. To do this, the second toothed wheel 40 is placed in the body 82, with its associated bearings. The screwed elements 88 provide the assembly of the various elements of the IGB box 36 and make it possible to obtain an assembly that can easily be manipulated by an operator, whether during the manufacture of the turbojet engine or during a maintenance operation.

Figure 6C:
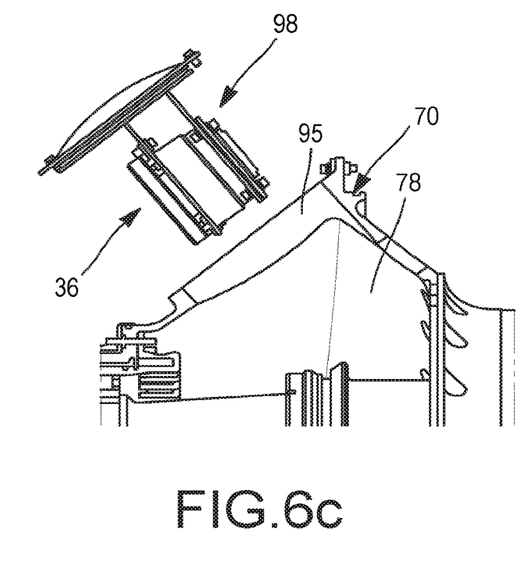
Figure 6D:
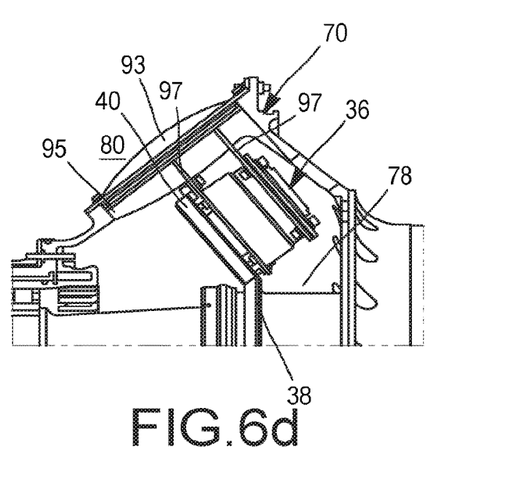

This assembly, referenced 98 in FIG. 6c, is next moved so that the IGB box 36 is introduced into the radially internal space 78, passing through the second opening 95 of the support 70, sized accordingly. This introduction is continued until the cover 93 closes off this opening, as shown in FIG. 6d. The sealed fixing of the cover 93 on the support 70 is next carried out, from the radially external space 80, by screwing. In this position, the connecting plates 97 pass through the opening 95 and bring the second toothed wheel 40 of the IGB box 36 to mesh with the first toothed wheel 38.

Figures 6E, 6F:
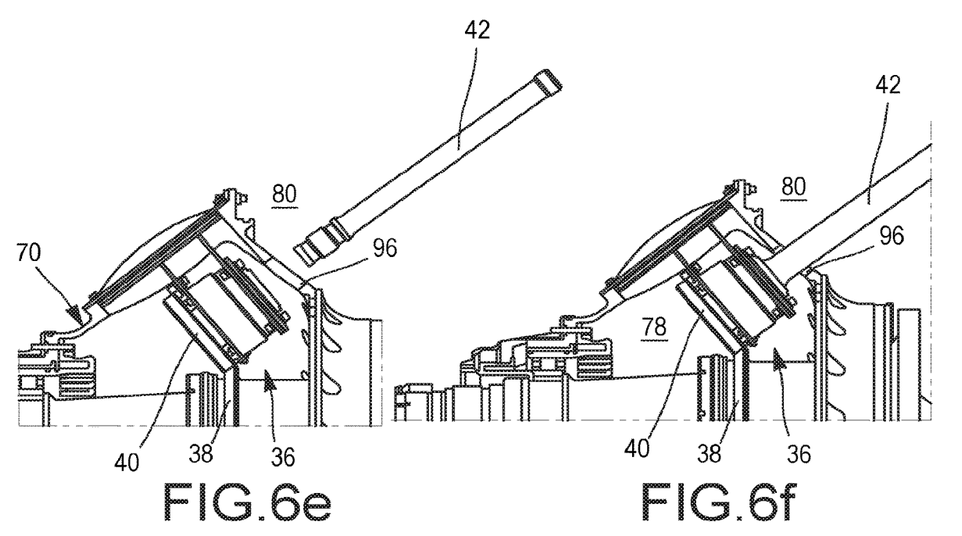

Next, the takeoff shaft 42 is introduced into the IGB box 36, also from the radially external space 80, as shown schematically in FIG. 6e. To do this, the shaft 42 passes through the first opening 96 formed through the second portion of the support 70. The shaft 42 is thus simply slid into the second wheel 40, until it comes into contact with the bottom in order to reach the position shown in FIG. 6f.

Thus it must be understood that the design adopted allows easy mounting and dismantling of the IGB box 36, particularly advantageous in the context of maintenance operations. This is because, before dismantling, once the shaft 42 is extracted from the box by movement through the first opening 96 of the bearing support 70, this box can be extracted from the radially internal space 78 through the second opening 95 sized accordingly. The bearing support 70 therefore does not require to be removed to allow access to the IGB box 36, which facilitates dismantling of the latter. Moreover, it should be noted that, when the opening 95 is arranged on the top part of engine, this makes it possible to open the lubrication chamber without causing any leakage of oil, thus preventing drainage of the chamber and facilitating the operation for the mechanics.

Naturally, when the box has to be remounted in the radially internal space, reverse operations are used.

Naturally, various modifications can be made by a person skilled in the art to the invention that has just been described, solely by way of non-limitative examples.

The invention claimed is:

1. A front part of an aircraft bypass turbine engine comprising:
   a roller bearing bracket delimiting, on either side thereof, a radially inner space and a radially outer space;
   a fan casing;
   a reduction gear; a fan surrounded by the fan casing, the reduction gear driving said fan;
   an accessory gearbox;
   a mechanical power takeoff box housed in the radially inner space and driving the accessory gearbox;
   a first toothed wheel and a second toothed wheel forming part of the mechanical power takeoff box and driven by said first toothed wheel, the second toothed wheel being housed in the radially inner space;
   a hub of the fan;
   a plurality of items of equipment, including an item of equipment for supplying the reduction gear with lubricant;
   a cover positioned in an opening of the roller bearing bracket that separates the radially inner space from the radially outer space to form a sealed connection with the roller bearing bracket; and
   means for mounting the mechanical power takeoff box on the cover positioned in the opening of the bearing bracket, and being configured so as to allow the introduction of said takeoff box in said radially inner space when the cover is positioned in the opening,
   wherein said first toothed wheel is constrained to rotate with the hub of the fan,
   wherein each of the items of equipment is driven by the accessory gearbox, and
   wherein said plurality of items of equipment, and the accessory gearbox, are arranged in an inter-duct compartment of the turbine engine.

2. The turbine-engine front part according to claim 1, wherein said fan hub is supported by two rolling bearings and in that said first toothed wheel is arranged axially between said two rolling bearings.

3. The turbine-engine front part according to claim 1, wherein the reduction gear comprises a gear train.

4. The turbine-engine front part according to claim 3, wherein the gear train is an epicyclic train that comprises:
   a low-pressure body including a low-pressure shaft;
   a sun gear rotated by the low-pressure shaft of the low-pressure body, and constrained to rotate with the low-pressure shaft;
   a stator;
   an external ring secured to the stator;
   planets meshing with the external ring and the sun gear; and
   a planet holder rotating the hub of the fan, constrained to rotate with the hub.

5. The turbine-engine front part according to claim 1, wherein said plurality of items of equipment are selected from a fuel pump, a hydraulic pump, a lubrication pump, an alternator, a starter and an electric power generator, and are driven by the accessory gearbox.

6. A bypass turbine engine for an aircraft, comprising a combustion chamber and the front part according to claim 1.

7. The turbine-engine according to claim 6, wherein the engine is a turbojet engine.

8. The turbine-engine front part according to claim 1, wherein the inter-duct compartment is located inside the fan casing.

9. The turbine-engine front part according to claim 1, wherein the inter-duct compartment is located between a first channel for a primary flow and a secondary channel for a secondary flow, the secondary channel being radially outward of the primary flow.

10. A front part of an aircraft bypass turbine engine comprising:
a roller bearing bracket delimiting, on either side thereof, a radially inner space and a radially outer space;
a fan casing;
a reduction gear;
a fan surrounded by the fan casing, the reduction gear driving said fan;
an accessory gearbox;
a mechanical power takeoff box housed in the radially inner space and driving the accessory gearbox;
a first toothed wheel and a second toothed wheel forming part of the mechanical power takeoff box and driven by said first toothed wheel, the second toothed wheel being housed in the radially inner space;
a hub of the fan;
a plurality of items of equipment, including an item of equipment for supplying the reduction gear with lubricant;
a cover positioned in an opening of the roller bearing bracket that separates the radially inner space from the radially outer space to form a sealed connection with the roller bearing bracket; and
means for mounting the mechanical power takeoff box on the cover positioned in the opening of the bearing bracket, and being configured so as to allow the introduction of said takeoff box in said radially inner space when the cover is positioned in the opening,
wherein said first toothed wheel is constrained to rotate with the hub of the fan,
wherein each of the items of equipment is driven by the accessory gearbox,
wherein said plurality of items of equipment, and the accessory gearbox, are arranged in an inter-duct compartment of the turbine engine, and
wherein the reduction gear is supplied with lubricant via a lubrication conduit extending from the item of equipment for supplying lubricant to the reduction gear.

11. The turbine-engine front part according to claim 1, further comprising:
an angle return box located in the inter-duct compartment;
a take-off shaft cooperating on one end with the angle return box and housed in the second toothed wheel at an other end; and
a rotary transmission shaft between the angle return box and the accessory gearbox to complete a kinematic chain therebetween.

12. The turbine-engine front part according to claim 10, further comprising:
an angle return box located in the inter-duct compartment;
a take-off shaft cooperating on one end with the angle return box and housed in the second toothed wheel at an other end; and
a rotary transmission shaft between the angle return box and the accessory gearbox to complete a kinematic chain therebetween.

13. The turbine-engine front part according to claim 1, further comprising:
a bearing support forming a stator of the aircraft bypass turbine engine, the bearing support situated in front of the reduction gear and supporting two rolling bearings, the two rolling bearings guiding a rotary assembly configured to be driven by a gas generator.

14. The turbine-engine front part according to claim 10, further comprising:
a bearing support forming a stator of the aircraft bypass turbine engine, the bearing support situated in front of the reduction gear and supporting two rolling bearings, the two rolling bearings guiding a rotary assembly configured to be driven by the gas generator.

15. The turbine-engine front part according to claim 1, wherein the means for mounting includes plates connected to the cover at a first end and a second end of the plates is secured to a fixed body of the mechanical power takeoff box, and the second toothed wheel is housed in the fixed body.

16. The turbine-engine front part according to claim 15, wherein two of the plates are integrally formed with the cover and the fixed body is positioned within an opening in the second end of each of the plates.

17. The turbine-engine front part according to claim 10, wherein the means for mounting includes plates connected to the cover at a first end and a second end of the plates is secured to a fixed body of the mechanical power takeoff box, and the second toothed wheel is housed in the fixed body.

18. The turbine-engine front part according to claim 17, wherein two of the plates are integrally formed with the cover and the fixed body is positioned within an opening in the second end of each of the plates.

19. A front part of an aircraft bypass turbine engine comprising:
a roller bearing bracket delimiting, on either side thereof, a radially inner space and a radially outer space,
a fan casing;
a reduction gear; a fan surrounded by the fan casing, the reduction gear driving said fan;
an accessory gearbox;
a mechanical power takeoff box housed in the radially inner space and driving the accessory gearbox;
a first toothed wheel and a second toothed wheel forming part of the mechanical power takeoff box and driven by said first toothed wheel;
a hub of the fan;
a plurality of items of equipment, including an item of equipment for supplying the reduction gear with lubricant;
a cover positioned in an opening of the roller bearing bracket to form a sealed connection with the roller bearing bracket; and
plates connected to the cover at a first end and a second end of the plates is secured to a fixed body of the mechanical power takeoff box, and the second toothed wheel is housed in the fixed body;
wherein said first toothed wheel is constrained to rotate with the hub of the fan,
wherein each of the items of equipment is driven by the accessory gearbox, and
wherein said plurality of items of equipment, and the accessory gearbox, are arranged in an inter-duct compartment of the turbine engine.

* * * * *

UNITED STATES PATENT AND TRADEMARK OFFICE
CERTIFICATE OF CORRECTION

PATENT NO. : 10,895,200 B2
APPLICATION NO. : 15/307066
DATED : January 19, 2021
INVENTOR(S) : Nowakowski et al.

Page 1 of 1

It is certified that error appears in the above-identified patent and that said Letters Patent is hereby corrected as shown below:

In the Claims

In Column 10, Claim 19, Line 36, delete "space," and insert -- space; --, therefor.

In Column 10, Claim 19, Line 56, delete "body;" and insert -- body, --, therefor.

Signed and Sealed this
Twenty-fourth Day of August, 2021

Drew Hirshfeld
*Performing the Functions and Duties of the*
*Under Secretary of Commerce for Intellectual Property and*
*Director of the United States Patent and Trademark Office*